Dec. 28, 1937.  C. O. CASTLEDINE  2,103,448
GASOLINE TANK FOR MOTOR VEHICLES
Filed Jan. 29, 1937
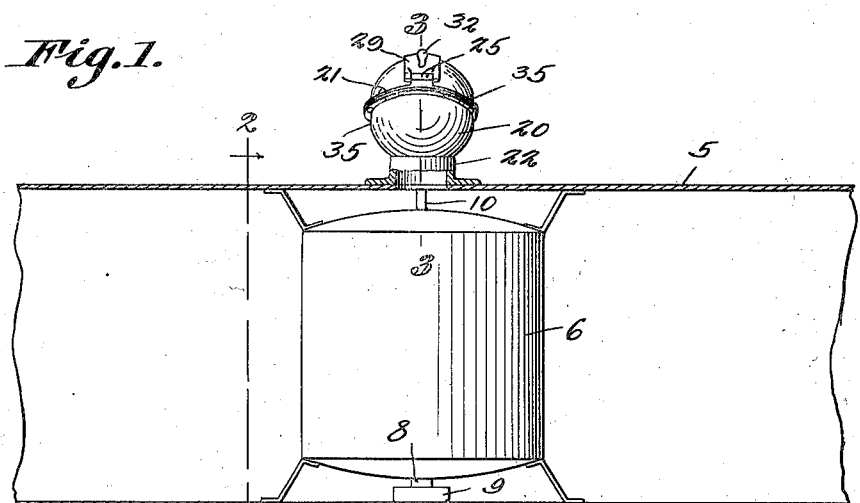
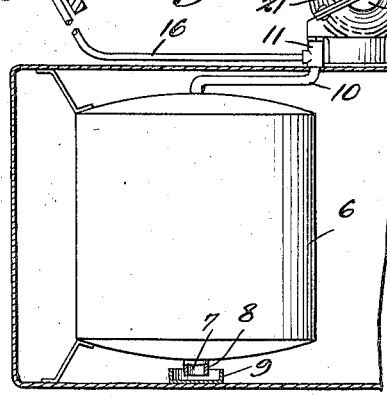
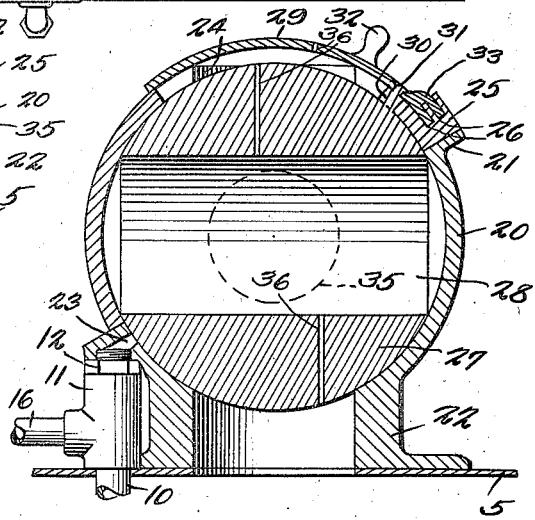
Inventor
C. O. Castledine Patented Dec. 28, 1937

2,103,448

UNITED STATES PATENT OFFICE 2,103,448

GASOLINE TANK FOR MOTOR VEHICLES

Charles Oliver Castledine, Windom, Minn.

Application January 29, 1937, Serial No. 123,043

7 Claims. (Cl. 158—46.5)

This invention relates to gasoline tanks for motor vehicles. One of its objects is to provide within the main tank, a supplemental tank for holding a reserve supply of gasoline, this reserve tank being so constructed that it will fill automatically when the main tank is filled and will remain filled while the main tank is being emptied, means being located within convenient access to the driver by which the reserve supply can be released into the main tank when needed.

Another object is to provide the tanks with a closure comprising cooperating spherical members shiftable relative to each other so that the filling nozzle can be inserted readily into the closure when in one position but the tank is tightly closed when the parts are in shut position.

A still further object is to provide simple and efficient means for locking the tank closure when shut.

A still further object is to provide a closure which is simple and compact in construction, can be manipulated readily, and will not easily get out of order.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a vertical section through a portion of the main gasoline tank and showing in elevation the reserve tank and the improved closure.

Figure 2 is a section on line 2—2, Figure 1, the trap portion of the reserve tank being shown in section.

Figure 3 is an enlarged vertical section through the closure, said section being on the line 3—3, Figure 1 and showing the closure shut.

Figure 4 is a view similar to Figure 3 and showing the closure open, the check valve of the supplemental tank being shown in section.

Referring to the figures by characters of reference, 5 designates the main gasoline tank of a motor vehicle. This tank has positioned within it a reserve tank 6 provided with an opening 7 in the bottom thereof surrounded by a depending open sleeve 8 which projects into a cup 9 located preferably on the bottom of the tank 5.

A vent pipe 10 extends upwardly from the reserve tank 6 to a T-fitting 11 the upper arm of which has a screw plug 12 with an opening 13 extending therethrough and provided with a valve seat 14. A check valve normally rests on this seat as indicated at 15. Extending from the fitting is a control tube 16 leading to a valve casing 17 which can be carried by the instrument board B of the vehicle. A valve 18 normally held closed by a spring 18', is seated in this casing and can be actuated by any suitable means, such as a knob 19.

Valve 18 is normally closed and when gasoline is delivered into the main tank 5 it will not only fill it but will also rise through sleeve 8 and opening 7 into reserve tank 6, the air in the reserve tank being displaced through the vent pipe 10 and past the valve 15. As gasoline is withdrawn from main tank 5 its level will fall but this will not affect the level of the gasoline within reserve tank 6 because the cup 9 and sleeve 8 cooperate to form a trap which will prevent the gasoline from draining out of tank 6 under normal conditions.

Should the supply of gasoline in the main tank become exhausted, the driver need only shift valve 18 so as to open it. This will allow air to flow through control tube 16 to fitting 11 and thence through vent pipe 10 into tank 6. As air pressures are thus equalized, the gasoline in the reserve tank will be free to flow by gravity through the outlet 7 into the main tank 5.

For the purpose of closing the tank 5 there is provided a novel structure shown in detail in Figures 3 and 4. This comprises a hollow spherical casing 20 made up of opposed sections which are joined at their meeting edges by bolts, screws or rivets or by welding, it being preferred to form annular flanges 21 at the meeting edges of the two sections.

The lower section of the casing 20 has a tubular connection 22 joined to the top of tank 5 and it is also provided with an air inlet 23 in communication with the upper arm of the fitting 11.

The upper section of the casing 20 is formed with a circular opening 24 in alinement with the opening in connection 22. The upper section is also formed with a lock 25 beyond opening 24 and this lock has any suitable means for engagement with a slidable cover plate hereinafter described. In the present instance grooves 26 are formed in the lock casing.

A spherical movable member 27 is snugly housed within casing 20 and has an opening 28 extending diametrically therethrough. Thus when the member 27 is rotated to one extreme position the diametrical opening 28 will register with opening 24 and with the opening in connection 22 so that a filling nozzle can be inserted into them. When the member 27 is rotated to its other extreme position the ends of the opening 28 will be brought to positions where they will be closed by the wall of casing 20, as shown in Figure 3.

A cover plate 29 which is concavo-convex so as to fit snugly upon the outer surface of casing 20, is attached in any suitable manner to the movable member 27. For example a stud 30 can be extended from said member, its outer end projecting into plate 29 and being upset as shown at 31. This plate 29 is of such size as to cover opening 24 when in one position and it has a handle 32 projecting from it so as to afford a means for shifting the plate. Tongues 33 can be extended from one end of the plate for engagement within the grooves 26 in lock casing 25 so that by actuating the lock the plate will be fastened to the lock casing. The closed or locked position of the plate is shown in Figure 3.

When the cover plate 29 is moved to open position as in Figure 4, the member 27 will be moved therewith. Member 27 can be ground so as to fit snugly within its casing. In the outer surface of this member there is formed a vent groove 34 which extends to the outer end of the opening 28 and is of such length that when the member 27 is in open position as in Figure 4, the said groove will also open into the air outlet 23.

Obviously during the filling of the tanks the air escaping from the reserve tank and flowing past check valve 15, will be released through outlet 23 and groove 34.

As it is desirable to have the spherical member rotate about one axis only, it is preferred to flatten the spherical casing and the corresponding portions of the rotatable member at one or more points as indicated, for example, at 35 in Figure 1. Vent holes 36 are provided in the member 27 and in the cover plate 29 thus permitting air to enter the tank as gasoline is withdrawn.

What is claimed is:

1. The combination with a main gasoline tank, a reserve tank therein having an air vent, a check valve for the vent, and a liquid trap at the bottom of the reserve tank and opening into both tanks, of means for directing gasoline into the two tanks and for sealing the tanks, said means including a spherical casing having alined outer and inner openings, a spherical member fitted snugly in the casing and having a diametrical opening therein, said member being rotatable to move its opening into or out of register with the openings in the casing and having means to open the vent when the member is in open position, and means for locking the rotatable member against movement when in closed position.

2. The combination with a main gasoline tank, a reserve tank therein having an air vent, a check valve for the vent, and a liquid trap at the bottom of the reserve tank and opening into both tanks, of means for directing gasoline into the two tanks and for sealing the tanks, said means including a spherical casing having alined outer and inner openings, a spherical member fitted snugly in the casing and having a diametrical opening therein, said member being rotatable to move its opening into or out of register with the openings in the casing and having means to open the vent when the member is in open position, a valve, and means under the control of the valve for admitting air to the reserve tank to release gasoline trapped in said tank so as to flow into the main tank.

3. The combination with a main gasoline tank, a reserve tank therein having an outlet sleeve at the bottom thereof, and a cup in the main tank into which the sleeve projects, of a vent pipe extending from the reserve tank, a check valve positioned to prevent return flow of air to the tank, a spherical casing opening into the main tank and having an outer opening for the reception of a filling nozzle, a spherical member rotatable within the casing and having a diametrical filling opening movable into and out of register with the openings in the casing, there being a vent groove in the spherical member movable into register with the vent pipe of the reserve tank when said spherical member is in filling position.

4. The combination with a main gasoline tank, a reserve tank therein having an outlet sleeve at the bottom thereof, and a cup in the main tank into which the sleeve projects, of a vent pipe extending from the reserve tank, a check valve positioned to prevent return flow of air to the tank, a spherical casing opening into the main tank and having an outer opening for the reception of a filling nozzle, a spherical member rotatable within the casing and having a diametrical filling opening movable into and out of register with the openings in the casing, there being a vent groove in the spherical member movable into register with the vent pipe of the reserve tank when said spherical member is in filling position, a valve, and means controlled by the valve for admitting air to the reserve tank, thereby to free the contents of the tank for gravitation through the sleeve and cup into the main tank.

5. The combination with a main gasoline tank, a reserve tank therein having an outlet sleeve at the bottom thereof, and a cup in the main tank into which the sleeve projects, of a vent pipe extending from the reserve tank, a check valve positioned to prevent return flow of air to the tank, a spherical casing opening into the main tank and having an outer opening for the reception of a filling nozzle, a spherical member rotatable within the casing and having a diametrical filling opening movable into and out of register with the openings in the casing, there being a vent groove in the spherical member movable into register with the vent pipe of the reserve tank when said spherical member is in filling position, a closure plate on the outer surface of the casing and connected to and movable with the rotatable member to cover and uncover the opening in the casing, and a lock for the cover plate.

6. The combination with a main gasoline tank, a reserve tank having a vent and a bottom outlet, and a liquid trap between said outlet and the interior of the main tank, of a valve positioned to prevent return flow of air to the reserve tank, a casing opening into the main tank and having an outer opening for the reception of a filling nozzle, a member rotatable within the casing and having a diametrical filling opening movable into and out of register with the openings in the casing, there being a vent groove in the spherical member movable into register with the vent of the reserve tank when said rotatable member is in filling position.

7. The combination with a main gasoline tank, a reserve tank having a vent and a bottom outlet, and a liquid trap between said outlet and the interior of the main tank, of a valve positioned to prevent return flow of air to the reserve tank, a casing opening into the main tank and having an outer opening for the reception of a filling nozzle, a member rotatable within the casing and having a diametrical filling opening movable into and out of register with the openings in the casing, there being a vent groove in the spherical member movable into register with the vent of the reserve tank when said rotatable member is in filling position, and means controlled by the user for admitting air to the reserve tank, thereby to free the contents of the tank for gravitation through the liquid seal into the main tank when the rotatable member is closed, there being a vent through the rotatable member for the escape of air from the main tank when said member is closed.

CHARLES OLIVER CASTLEDINE.